United States Patent
Tang et al.

(10) Patent No.: US 11,042,679 B1
(45) Date of Patent: Jun. 22, 2021

(54) DIAGNOSIS RESOLUTION PREDICTION

(71) Applicant: Mentor Graphics Corporation, Wilsonville, OR (US)

(72) Inventors: Huaxing Tang, Wilsonville, OR (US); Jakub Janicki, Poznan (PL)

(73) Assignee: Siemens Industry Software Inc., Plano, TX (US)

(*) Notice: Subject to any disclaimer, the term of this patent is extended or adjusted under 35 U.S.C. 154(b) by 0 days.

(21) Appl. No.: 17/007,670

(22) Filed: Aug. 31, 2020

(51) Int. Cl.
*G06F 30/3308* (2020.01)
*G06F 30/398* (2020.01)
*G06F 119/02* (2020.01)

(52) U.S. Cl.
CPC ........ *G06F 30/3308* (2020.01); *G06F 30/398* (2020.01); *G06F 2119/02* (2020.01)

(58) Field of Classification Search
CPC ... G06F 30/3308; G06F 3/398; G06F 2119/02
USPC ............................ 716/136, 106, 111; 703/16
See application file for complete search history.

(56) References Cited

U.S. PATENT DOCUMENTS

| | | | | |
|---|---|---|---|---|
| 5,293,387 A * | 3/1994 | Booth | ................ | G06F 11/2257 714/737 |
| 5,570,376 A * | 10/1996 | Kunda | ................ | G06F 11/2257 714/736 |
| 6,461,882 B2 * | 10/2002 | Ishida | ............ | G01R 31/318342 438/17 |
| 6,975,978 B1 * | 12/2005 | Ishida | ............ | G01R 31/318342 324/762.03 |
| 7,971,119 B2 * | 6/2011 | Hsu | ................ | G01R 31/318547 714/741 |
| 10,353,789 B1 * | 7/2019 | Najibi | .................... | G06F 11/261 |
| 10,592,625 B1 * | 3/2020 | Tang | .................. | G01R 31/2894 |
| 10,657,207 B1 * | 5/2020 | Tang | ..................... | G06F 30/398 |
| 2002/0035708 A1 * | 3/2002 | Ishida | ................ | G01R 31/2882 714/25 |
| 2003/0177416 A1 * | 9/2003 | Manley | ..................... | H04L 1/24 714/33 |
| 2004/0133833 A1 * | 7/2004 | Nozuyama | ..... | G01R 31/318342 714/738 |

(Continued)

OTHER PUBLICATIONS

Lam, "Hardware Design Verificaiton: Simulation and Formal Method-Based Approaches", Prentice Hall PTR, Mar. 3, 2005, 624 pages. (Year: 2005).*

*Primary Examiner* — Phallaka Kik

(57) ABSTRACT

This application discloses a computing system implementing an automatic test pattern generation tool to generate test patterns to apply to scan chains in an integrated circuit. The computing system can implement a defect diagnosis tool to simulate a circuit design describing an integrated circuit, inject faults from a fault list into the simulated circuit design, and apply the test patterns to the simulated circuit design. The computing system implementing the defect diagnosis tool can determine fault responses to the test patterns read from the simulated circuit design, which indicate a detection of the faults injected in the simulated circuit design, compress, for each of the faults in the fault list, the fault responses into fault signatures, consolidate the faults from the fault list into fault groups based on the fault signatures, and estimate a diagnosis resolution for the integrated circuit based, at least in part, on the fault groups.

20 Claims, 5 Drawing Sheets

(56) References Cited

U.S. PATENT DOCUMENTS

| | | | |
|---|---|---|---|
| 2004/0205436 A1* | 10/2004 | Kundu | G06F 11/00 714/741 |
| 2004/0205681 A1* | 10/2004 | Nozuyama | G06F 11/263 716/112 |
| 2006/0053357 A1* | 3/2006 | Rajski | G01R 31/2894 714/742 |
| 2007/0168789 A1* | 7/2007 | Udell | G06F 11/2242 714/724 |
| 2007/0226570 A1* | 9/2007 | Zou | G01R 31/3177 714/741 |
| 2007/0288822 A1* | 12/2007 | Lin | G01R 31/318328 714/741 |
| 2009/0177936 A1* | 7/2009 | Koenemann | G01R 31/31703 714/737 |

* cited by examiner

DIAGNOSIS RESOLUTION PREDICTION

TECHNICAL FIELD

This application is generally related to electronic design automation and, more specifically, to prediction diagnostic resolution for an integrated circuit design.

BACKGROUND

Since defects in integrated circuits can be introduced during manufacturing, manufacturers often test integrated circuit chips to identify faults and diagnose defects in the integrated circuit chips. Integrated circuit testing typically includes applying a set of test stimuli or test patterns to a circuit-under-test and then analyzing responses generated by the circuit-under-test. To make it easier to develop and apply test patterns, certain testability features can be added to integrated circuit designs, referred to as design for test or design for testability (DFT). In a design for test scheme, called scan chain testing, sequential state elements in integrated circuit designs, for example, latches, flip-flops, or the like, can be made controllable and observable via a serial interface. For example, the sequential state elements can be replaced with dual-purpose state elements, called scan cells, which can be connected together to form scan chains acting as serial shift registers for shifting in test patterns and shifting out test responses.

Automatic Test Equipment (ATE) can load test patterns to scan chains in a circuit-under-test and unload test responses from the scan chain in the circuit-under-test. A defect diagnosis process can utilize the test patterns and test responses from the scan chains to identify suspected defects and isolate them to particular locations in the circuit-under-test, for example, by applying a fail model to the output of the scan chains to generate a fail log, and then analyzing the fail log to locate the suspected defects. A physical failure analysis (PFA) process can be performed to determine whether the suspected defects correspond to actual defects by physically inspecting integrated circuit chips, usually by etching away certain layers of the integrated circuit chips and then imaging the silicon surface using electronic microscopy or focused ion beams. The number of actual defects determined during the PFA process relative to a number of suspected defects identified during defect diagnosis can correspond to a diagnosis resolution associated with the defect diagnosis process. As the number of suspected defect increases and the diagnosis resolution decreases, the more onerous, time-consuming, and even impractical the PFA process becomes.

SUMMARY

This application discloses a computing system implementing an automatic test pattern generation tool to generate test patterns to apply to scan chains in an integrated circuit. The computing system can implement a defect diagnosis tool to simulate a circuit design describing an integrated circuit, inject faults from a fault list into the simulated circuit design, and apply the test patterns to the simulated circuit design. The computing system implementing the defect diagnosis tool can determine fault responses to the test patterns read from the simulated circuit design, which indicate a detection of the faults injected in the simulated circuit design, compress, for each of the faults in the fault list, the fault responses into fault signatures, consolidate the faults from the fault list into fault groups based on the fault signatures, and estimate a diagnosis resolution for the integrated circuit based, at least in part, on the fault groups. Embodiments of will be described below in greater detail.

DETAILED DESCRIPTION

Illustrative Operating Environment

Figure 1:
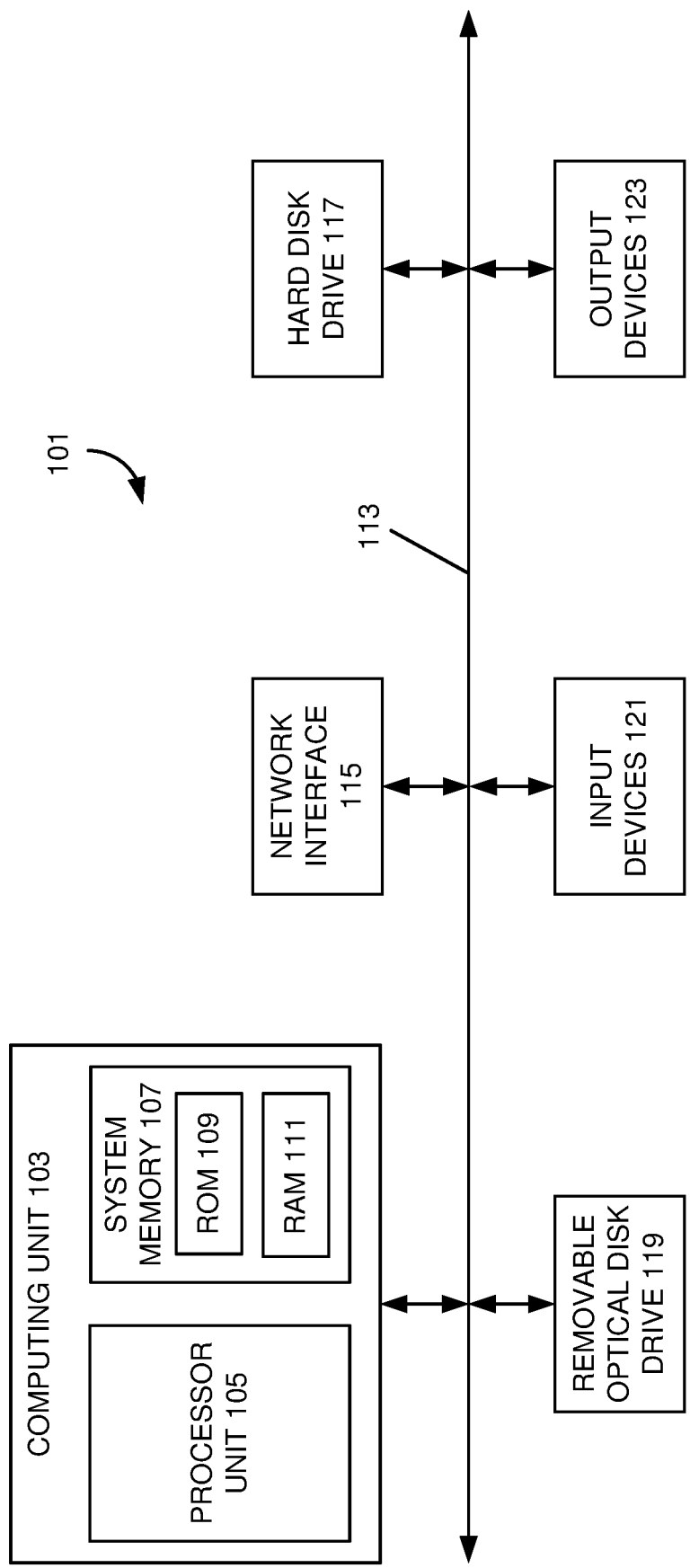
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processor unit 105 and a system memory 107. The processor unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processor unit 105.

The processor unit 105 and the system memory 107 are connected, either directly or indirectly, through a bus 113 or alternate communication structure, to one or more peripheral devices 115-123. For example, the processor unit 105 or the system memory 107 may be directly or indirectly connected to one or more additional memory storage devices, such as a hard disk drive 117, which can be magnetic and/or removable, a removable optical disk drive 119, and/or a flash memory card. The processor unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
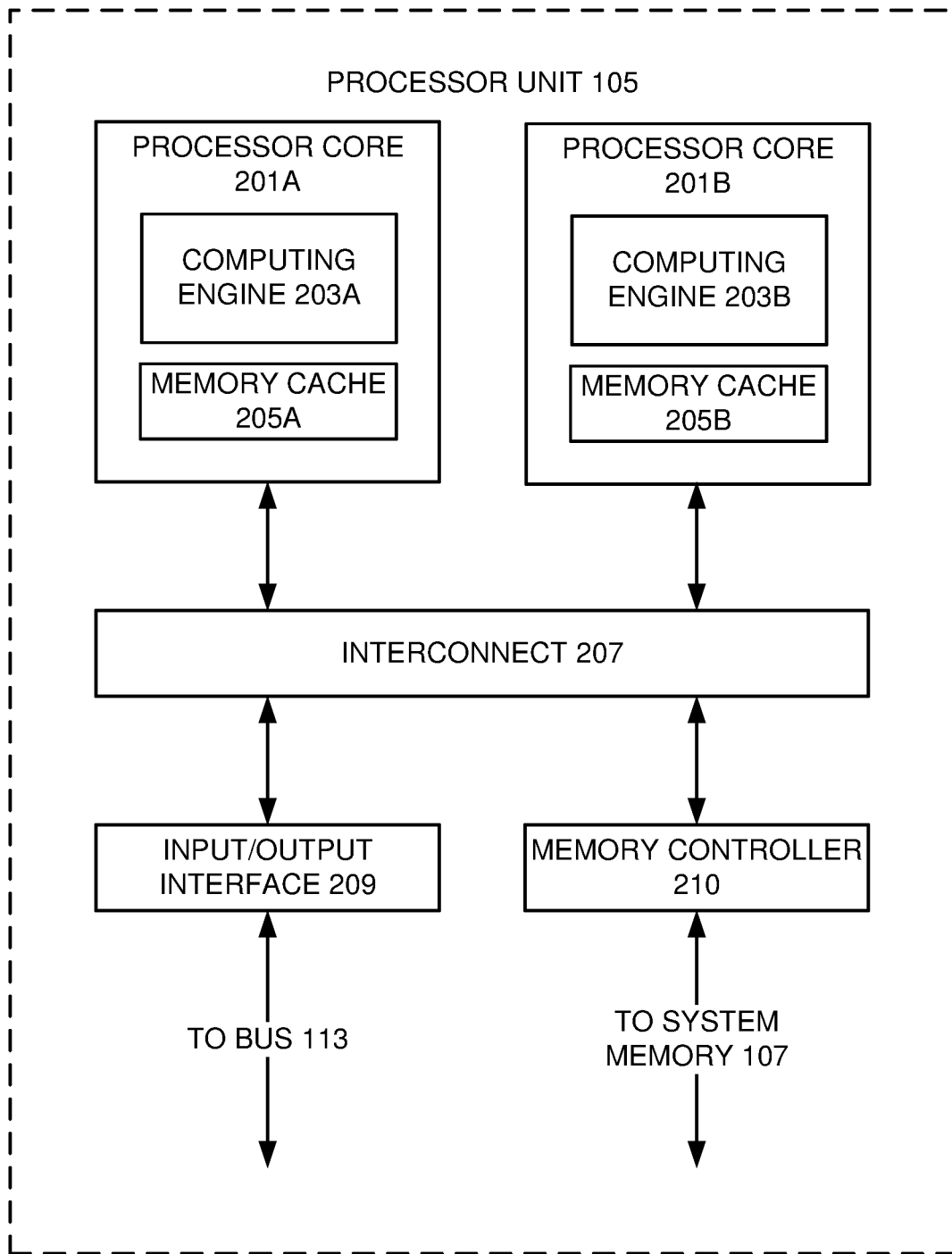

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Diagnosis Resolution Prediction

Figure 3:
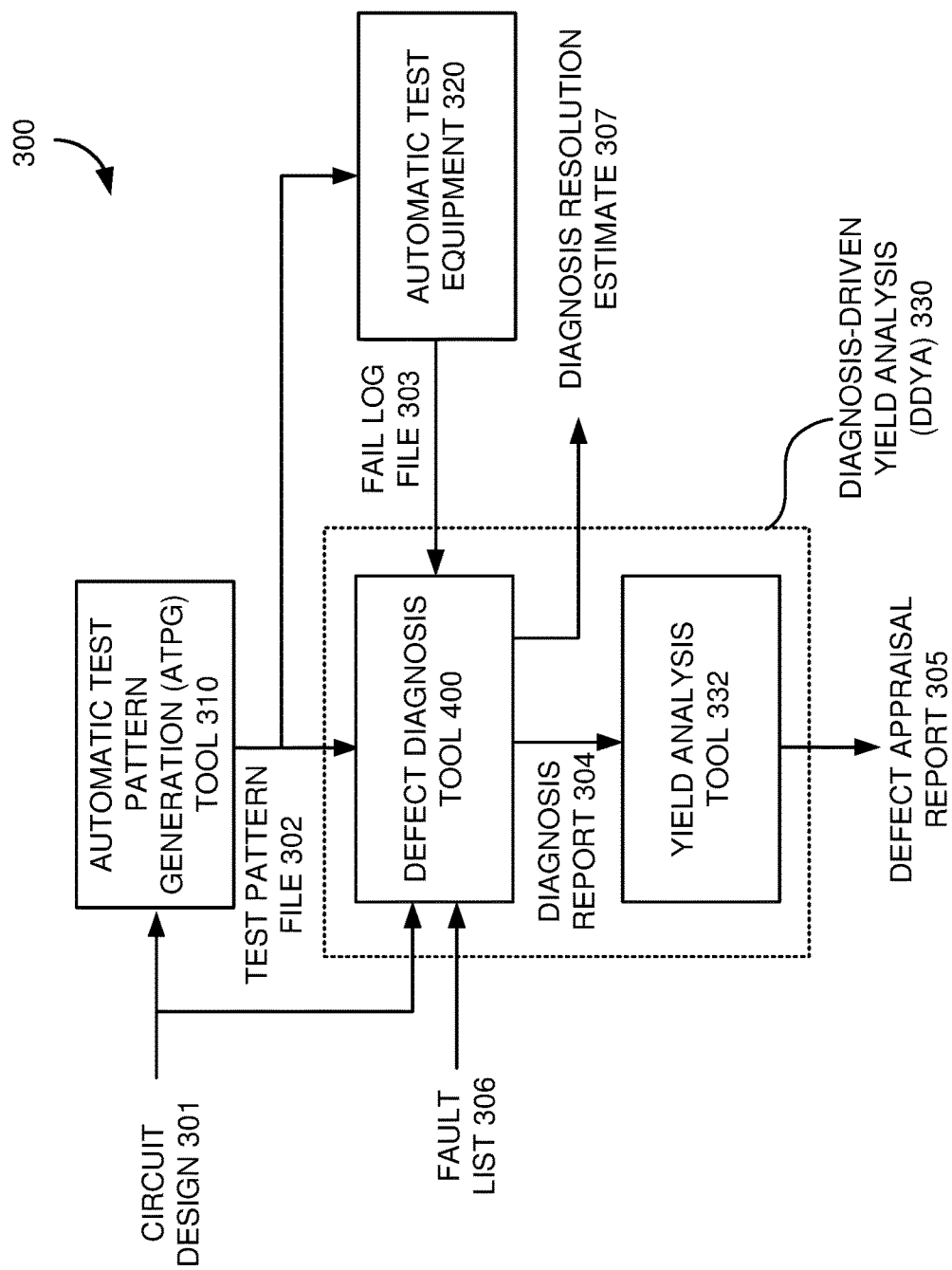
FIG. 3 illustrates an example design for test system including a defect diagnosis tool and a yield analysis tool that may be implemented according to various embodiments.

FIG. 3 illustrates an example design for test system 300 including a defect diagnosis tool 400 and a yield analysis tool 332 that may be implemented according to various embodiments. Referring to FIG. 3, the design for test system 300 includes the ATPG tool 310 to generate a test pattern file 302 based, at least in part, on a circuit design 301 that describes an integrated circuit in a gate-level netlist format. The circuit design 301 also includes design for test circuitry, such as scan chains, which can be loaded and unloaded with test patterns to detect a presence of defects, such as a stuck-at 0 fault defect, a stuck-at 1 fault defect, or the like, in a manufactured integrated circuit.

The test pattern file 302 can identify test patterns to be serially loaded into and unloaded from one or more scan chains in the integrated circuit described by the circuit design 301. For example, when attempting to determine a presence of a stuck-at 0 defect, the ATPG tool 310 can generate test patterns having values of "1" shifted through the scan chain. When attempting to determine a presence of a stuck-at 1 defect, the ATPG tool 310 can generate test patterns having values of "0" shifted through the scan chain.

The design for test system 300 can provide the test pattern file 302 to Automatic Test Equipment (ATE) 320, which can generate the test patterns using the test pattern file 302 and apply them to manufactured integrated circuits described by the circuit design 301. The ATE 320 can generate a fail log file 303, for example, in response to the applied test patterns described in the test pattern file 302, which can include a list of test responses unloaded from scan chains that correspond to a failure and the test patterns applied to the manufactured integrated circuits to generate the test responses.

The design for test system 300 can implement a diagnosis-driven yield analysis (DDYA) 330, for example, with the defect diagnosis tool 400 and the yield analysis tool 332, which can produce a defect appraisal report 305 from the fail log file 303. In some embodiments, the defect appraisal report 305 can identify suspected defects in the manufactured integrated circuits corresponding to a failures described in the fail log 303, along with probabilities that the suspect defects correspond to a root cause of the failures in the fail log file 303.

The defect diagnosis tool 400 can utilize the fail log file 303 to diagnose suspected defect that could produce the failures in the fail log file 303. In some embodiments, the defect diagnosis tool 400 can determine portions of the manufactured integrated circuit corresponding to the suspected defects associated with the scan chain and generate a diagnosis report 304, which can describe the suspected defects. The yield analysis tool 332 can generate the defect appraisal report 305 from the diagnosis report 304 from the defect diagnosis tool 400.

The portions of the manufactured integrated circuit identified as suspected defects in the defect appraisal report 305 can be subsequently inspected during a Physical Failure Analysis process to identify a presence of any manufacturing faults corresponding to the suspected defects. A ratio of actual manufacturing faults identified through the Physical Failure Analysis process relative to the suspected defects can correspond to a defect resolution.

The defect diagnosis tool 400 also can predict the diagnosis resolution from the circuit design 301, for example, prior to the manufacture of the integrated circuits described in the circuit design 301. The defect diagnosis tool 400 can utilize the circuit design 301, the test pattern file 302, and a fault list 306 to simulate faults in the circuit design 301 and estimate the diagnosis resolution associated with the circuit design 301 based on the simulation of the faults. The fault list 306, in some embodiments, can describe fault sites in the circuit design 301, such as pins or other locations faults can occur, along with the type of faults, such as stuck-at 1, stuck-at 0, or the like, to inject that the fault sites. The defect diagnosis tool 400 can generate a diagnosis resolution estimate 307, which can describe an estimate of the diagnosis resolution for the circuit design 301. In some embodiments, the diagnosis resolution estimate 307 can be utilized to modify the circuit design 301, for example, to increase a number of scan chains in the circuit design 301 or eliminate problematic circuit structures, which could provide increased diagnosis resolution or particularity regarding root causes of potential faults in a manufactured integrated circuit described by the circuit design 301. In other embodiments, the ATPG tool 310 can utilize the diagnosis resolution estimate 307 to modify the test pattern file 302 to include additional test patterns to apply to the manufactured integrated circuit described by the circuit design 301 during test operations. Embodiments of the defect diagnosis tool 400 will be described below in greater detail.

Figure 4:
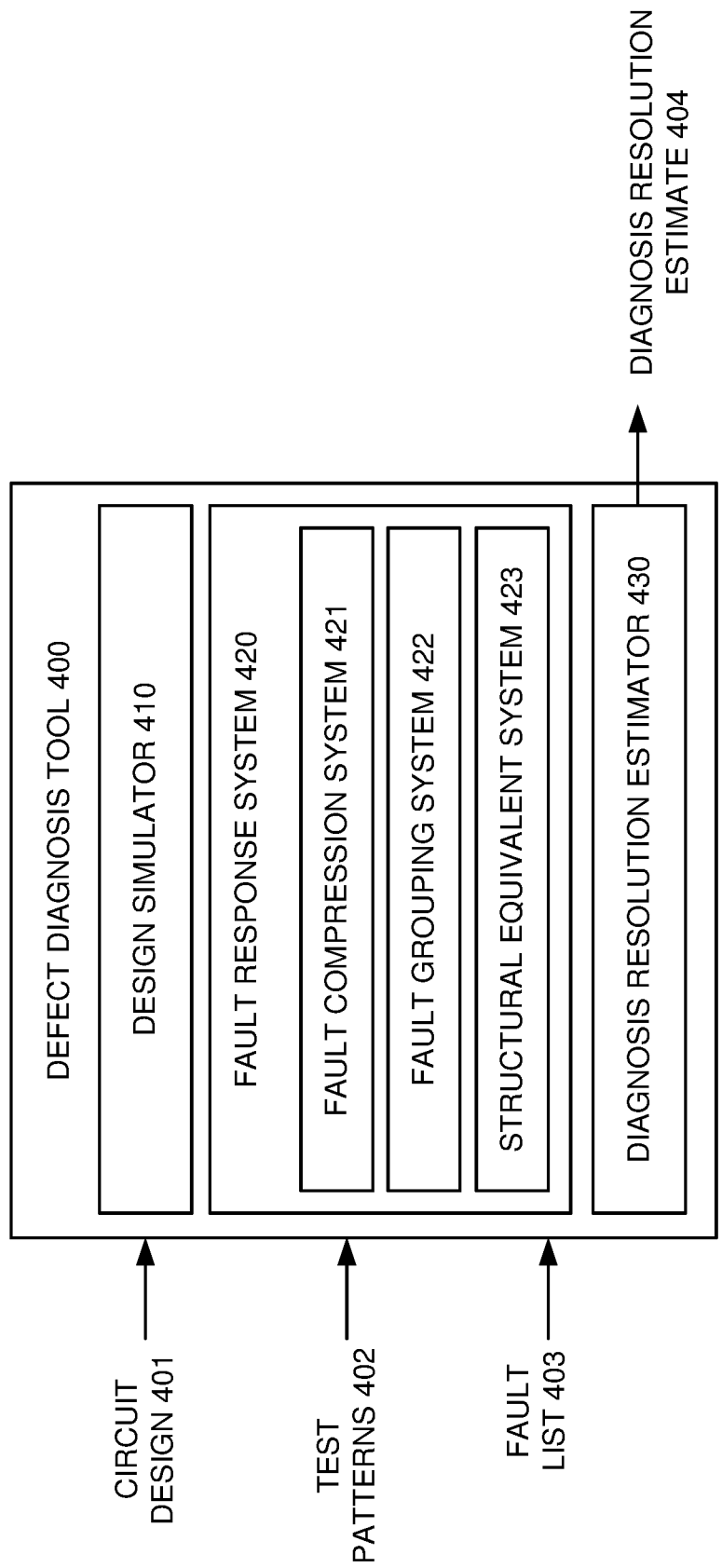
FIG. 4 illustrates an example a defect diagnosis tool to estimate a diagnosis resolution for an integrated circuit design, which may be implemented according to various embodiments.
Figure 5:
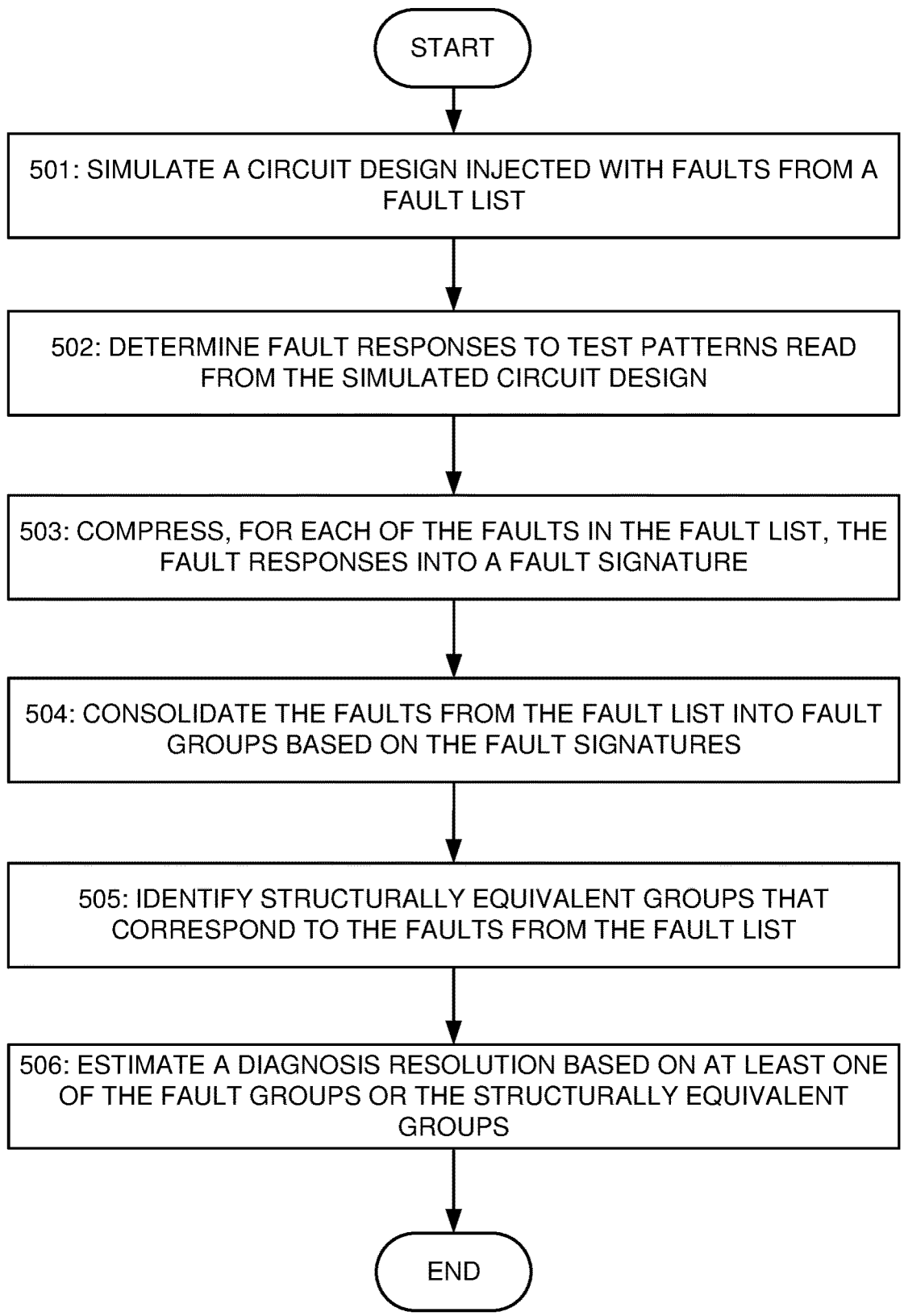
FIG. 5 illustrates a flowchart showing an example implementation of diagnosis resolution prediction from an integrated circuit design according to various examples.

FIG. 4 illustrates an example a defect diagnosis tool 400 to estimate a diagnosis resolution for an integrated circuit design, which may be implemented according to various embodiments. FIG. 5 illustrates a flowchart showing an example implementation of diagnosis resolution prediction from an integrated circuit design according to various examples. Referring to FIGS. 4 and 5, the defect diagnosis tool 400, for example, implemented by the computing device 101 in FIG. 1, can receive a circuit design 401 that describes an integrated circuit in a gate-level netlist format. The circuit design 301 also includes design for test circuitry, such as scan chains, which can be loaded and unloaded with test patterns to detect a presence of defects, such as a stuck-at 0 fault defect, a stuck-at 1 fault defect, or the like, in a manufactured integrated circuit.

The defect diagnosis tool 400 can receive or generate test patterns, for example, determined by an ATPG tool, such as the ATPG tool 310 in FIG. 3, to be serially loaded into and unloaded from one or more scan chains in the integrated circuit described by the circuit design 301. For example, when attempting to determine a presence of a stuck-at 0 defect, the ATPG tool 310 can generate test patterns having values of "1" shifted through the scan chain. When attempting to determine a presence of a stuck-at 1 defect, the ATPG tool 310 can generate test patterns having values of "0" shifted through the scan chain.

The defect diagnosis tool 400 can receive a fault list 403 describing faults for the circuit design 401. In some embodiments, the fault list 403 can identify each pin in the circuit design 401 as corresponding to a different fault site and identify types of fault capable of occurring at the fault sites, such as a stuck-at zero fault, a stuck-at one fault, or the like.

The defect diagnosis tool 400 can include a design simulator 410 that, in a block 501 of FIG. 5, can simulate the circuit design 401 injected with faults from the fault list 403. In some embodiments, the design simulator 410 can identify the fault sites from the fault list 403, simulate the circuit design 401, iteratively inject the simulated circuit design 401 with a fault at a fault site described in the fault list 403 and apply the test patterns 402 to the simulated circuit design. The design simulator 410 can record test responses to the test patterns 402 applied to the simulated circuit design with the injected faults.

The defect diagnosis tool 400 can include a fault response system 420 that, in a block 502 of FIG. 5, can determine fault responses to test patterns read from the simulated circuit design. The fault responses can correspond to those test responses recorded by the design simulator 410 during simulation that identified a presence of a fault injected into the simulated circuit design. In some embodiments, the fault response system 420 can apply a fault model to the test responses to determine the fault responses.

The fault response system 420 can include a fault compression system 421 that, in a block 503 of FIG. 5, can compress, for each of the faults in the fault list 403, the fault responses into a fault signature. In some embodiments, the fault compression system 421 utilizes a linear-feedback shift register (LFSR), bit manipulation shifting, or the like, to aggregate and compress the fault responses for a particular fault into a faults signature. The fault signatures, in some examples, can be 64-bit values, each capable of uniquely identifying a particular set of fault responses.

The fault response system 420 can include a fault grouping system 422 that, in a block 504 of FIG. 5, identifies fault groups that correspond to the faults from the fault list 403 based on the fault signatures. The fault grouping system 422 can aggregate or consolidate the fault signatures into fault groups. In some embodiments, when the fault signatures for different faults are the same, the fault grouping system 422 can consolidate the fault signatures into a single fault group.

The fault response system 420 can include a structural equivalent system 423 that, in a block 505 of FIG. 5, identifies structurally equivalent groups that correspond to the faults from the fault list 403. In some embodiments, the circuit design 401 can describe circuitry where different that a location of faults cannot be differentiated through the application of test patterns 402. For example, in some circuit designs a buffer or flip-flop may have a fault associated with its input or output, but the application of test patterns may be unable to determine which location the fault exists due to the structure of the circuit designs.

The defect diagnosis tool 400 can include a diagnosis resolution estimator 430 that, in a block 506 of FIG. 5, estimates a diagnosis resolution based on at least one of the fault groups or the structurally equivalent groups. In some embodiments, the diagnosis resolution estimator 430 can generate a diagnosis resolution estimate 404 based on the fault groups according Equation 1.

$$DRE = \frac{1}{N}\sum_{j=1}^{M} m_j * m_j \qquad \text{Equation 1}$$

In Equation 1, N can correspond to a total number of faults in the fault list 403, M can correspond to a total number of equivalent fault groups determined by the fault grouping system 422, and variable m can correspond to a number of fault signatures consolidated into the corresponding fault groups. The diagnosis resolution estimator 430 can generate the diagnosis resolution estimate 404 or DRE by squaring the number of faults in each equivalent fault group, summing all of the squares, and dividing the sum of the squares by the total number of faults in the fault list 403. When each fault in the fault list 403 has a different fault signature, for example, the fault responses from the simulation of the circuit design 401 with the injected fault produces different sets of fault responses, the diagnosis resolution estimate 404 can be equal to 1. When the fault response system 420 determines one or more fault groups include multiple equivalent faults, however, the value of the diagnosis resolution estimate 404 can rise above 1, predicting a diagnosis resolution associated with a defective manufactured integrated circuit may be of a lower quality and lead to additional physical inspection of the manufactured integrated circuit to identify locations of any manufacturing-related defects.

In some embodiments, the diagnosis resolution estimator 430 can generate a diagnosis resolution estimate 404 based on the structural equivalent group according Equation 2.

$$DRE(\text{lower bounds}) = \frac{1}{N}\sum_{k=1}^{C} c_k * c_k \qquad \text{Equation 2}$$

In Equation 2, N can correspond to a total number of faults in the fault list 403, C can correspond to a total number of structurally equivalent groups determined by the structurally equivalent system 423, and variable k can correspond to a number of faults that were consolidated into the corresponding structurally equivalent groups. The diagnosis resolution estimator 430 can generate a lower bound for the diagnosis resolution estimate 404 by squaring the number of faults in each of the structurally equivalent groups, summing all of the squares, and dividing the sum of the squares by the total number of faults in the fault list 403. When the circuit design 401 does not include a structurally equivalent circuitry, the lower bounds of the diagnosis resolution estimate 404 can be 1. When the structural equivalent system 423 identified structurally equivalent circuitry, however, the value of the lower bound of the diagnosis resolution estimate 404 can rise above 1. The diagnosis resolution estimator 430 can select the lower bound as the diagnosis resolution estimate 404 when the lower bound exceeds the diagnosis resolution estimated based on the fault groups.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to design processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:
1. A method comprising:
applying, by a computing system, test patterns to a simulated circuit design describing an integrated circuit having been injected with faults from a fault list;

determining, by the computing system, fault responses to the test patterns read from the simulated circuit design, which indicate a detection of the faults injected in the simulated circuit design;

consolidating, by the computing system, the faults from the fault list into fault groups based on the fault responses; and estimating, by the computing system, a diagnosis resolution for the integrated circuit based, at least in part, on the fault groups.

2. The method of claim 1, further comprising compressing, by the computing system for each of the faults in the fault list, the fault responses into fault signatures, wherein consolidating the faults from the fault list into the fault groups is based on the fault signatures.

3. The method of claim 1, wherein consolidating the faults from the fault list into the fault groups is based on the fault signatures further comprising identifying a plurality of the fault signatures that are identical and allocating the faults associated with the identified fault signatures into one of the fault groups.

4. The method of claim 1, wherein estimating the diagnosis resolution for the integrated circuit is based, at least in part, on a number of the fault groups and a number of the faults in each of the identified fault groups.

5. The method of claim 1, wherein estimating the diagnosis resolution for the integrated circuit further comprises:
identifying the faults from the fault list that are structurally equivalent in the circuit design;
collapsing the identified faults into structurally equivalent groups; and
estimating the diagnosis resolution for the integrated circuit based, at least in part, on a number of the structurally equivalent groups and a number of the faults in each of the structurally equivalent groups.

6. The method of claim 1, further comprising modifying, by the computing system, the circuit design to include additional scan chains based on the estimated diagnosis resolution.

7. The method of claim 1, wherein the faults in the fault list corresponds to a stuck-at one defect or a stuck-at zero defect.

8. A system comprising:
a memory system configured to store computer-executable instructions; and
a computing system, in response to execution of the computer-executable instructions, is configured to:
apply test patterns to a simulated circuit design describing an integrated circuit having been injected with faults from a fault list;
determine fault responses to the test patterns read from the simulated circuit design, which indicate a detection of the faults injected in the simulated circuit design;
consolidate the faults from the fault list into fault groups based on the fault responses; and
estimate a diagnosis resolution for the integrated circuit based, at least in part, on the fault groups.

9. The system of claim 8, wherein the computing system, in response to execution of the computer-executable instructions, is further configured to compress, for each of the faults in the fault list, the fault responses into fault signatures, and consolidate the faults from the fault list into the fault groups based on the fault signatures.

10. The system of claim 8, wherein the computing system, in response to execution of the computer-executable instructions, is further configured to:
consolidate the faults from the fault list into the fault groups based on the fault signatures;
identify a plurality of the fault signatures that are identical; and
allocate the faults associated with the identified fault signatures into one of the fault groups.

11. The system of claim 8, wherein the computing system, in response to execution of the computer-executable instructions, is further configured to estimate the diagnosis resolution for the integrated circuit based, at least in part, on a number of the fault groups and a number of the faults in each of the identified fault groups.

12. The system of claim 8, wherein the computing system, in response to execution of the computer-executable instructions, is further configured to estimate the diagnosis resolution for the integrated circuit by:
identifying the faults from the fault list that are structurally equivalent in the circuit design;
collapsing the identified faults into structurally equivalent groups; and
estimating the diagnosis resolution for the integrated circuit based, at least in part, on a number of the structurally equivalent groups and a number of the faults in each of the structurally equivalent groups.

13. The system of claim 8, wherein the computing system, in response to execution of the computer-executable instructions, is further configured to modify the circuit design to include additional scan chains based on the estimated diagnosis resolution.

14. An apparatus comprising at least one computer-readable memory device storing instructions configured to cause one or more processing devices to perform operations comprising:
applying test patterns to a simulated circuit design describing an integrated circuit having been injected with faults from a fault list;
determining fault responses to the test patterns read from the simulated circuit design, which indicate a detection of the faults injected in the simulated circuit design;
consolidating the faults from the fault list into fault groups based on the fault responses; and
estimating a diagnosis resolution for the integrated circuit based, at least in part, on the fault groups.

15. The apparatus of claim 14, wherein the instructions are configured to cause one or more processing devices to perform operations further comprising compressing, for each of the faults in the fault list, the fault responses into fault signatures, and consolidating the faults from the fault list into the fault groups based on the fault signatures.

16. The apparatus of claim 14, wherein the instructions are configured to cause one or more processing devices to perform operations further comprising:
consolidating the faults from the fault list into the fault groups based on the fault signatures;
identifying a plurality of the fault signatures that are identical; and
allocating the faults associated with the identified fault signatures into one of the fault groups.

17. The apparatus of claim 14, wherein the instructions are configured to cause one or more processing devices to perform operations further comprising estimating the diagnosis resolution for the integrated circuit based, at least in part, on a number of the fault groups and a number of the faults in each of the identified fault groups.

18. The apparatus of claim 14, wherein the instructions are configured to cause one or more processing devices to perform operations further comprising estimating the diagnosis resolution for the integrated circuit by:
- identifying the faults from the fault list that are structurally equivalent in the circuit design;
- collapsing the identified faults into structurally equivalent groups; and
- estimating the diagnosis resolution for the integrated circuit based, at least in part, on a number of the structurally equivalent groups and a number of the faults in each of the structurally equivalent groups.

19. The apparatus of claim 14, wherein the instructions are configured to cause one or more processing devices to perform operations further comprising modifying the circuit design to include additional scan chains based on the estimated diagnosis resolution.

20. The apparatus of claim 14, wherein the faults in the fault list corresponds to a stuck-at one defect or a stuck-at zero defect.

\* \* \* \* \*